United States Patent Office 3,300,509
Patented Jan. 24, 1967

3,300,509
ANTHRAQUINONE VAT DYESTUFFS CONTAINING SULFOHALIDE GROUPS
Kurt Weber, Basel, Switzerland, assignor to Ciba Limited, Basel, Switzerland, a Swiss company
No Drawing. Filed Jan. 27, 1964, Ser. No. 340,528
Claims priority, application Switzerland, Feb. 10, 1961, 1,582/61; Dec. 19, 1961, 14,711/61
13 Claims. (Cl. 260—307.5)

This is a continuation-in-part of my application Serial No. 171,572, filed February 7, 1962.

The present invention is based on the observation that the dyes of the formula

[Structural formula]

in which X represents a member selected from the group consisting of a direct bond and an arylene bridge of at most two six-membered rings, $n$ is a whole number up to 2, A represents an anthraquinone radical and Y represents an at most bicyclic aroyl group containing a sulfohalide group, are valuable vat dyestuffs, despite the fact they contain a sulfohalide group which is hydrolyzable in the vat and despite the fact that similar sulfohalides, such as the known sulfohalide of the formula

[Structural formula with $SO_2$—Cl]

are not.

The invention also provides a process for the manufacture of the above vat dyestuffs, wherein a vat dyestuff or vat dyestuff intermediate, which contains at least one acylatable amino group and at least one oxdiazole ring, is acylated at the amino group with an aliphatic or preferably an aromatic carboxylic acid halide containing a sulfohalide group, i.e. a halogen-$SO_2$-group.

The following are examples of starting materials which contain amino groups and are converted into vat dyestuffs by acylation:

Reaction products of anthraquinones which contain two free amino groups, preferably 1:5-diaminoanthraquinone, with reactive derivatives, for example, the lower alkyl esters or preferably halides, of the following dicarboxylic acids:

2:5-bis-[4′-carboxy-phenyl-1(1′)]-1:3:4-oxdiazole of the formula

HOOC—⟨ ⟩—C⟨ ⟩C—⟨ ⟩—COOH
         N——N

2:5-bis-[3′-carboxy-phenyl-(1′)-]-1:3:4-oxidazole of the formula

HOOC—⟨ ⟩—C⟨ ⟩C—⟨ ⟩—COOH
         N——N

2:5-bis-[4″-carboxy-diphenyl-(4′)]-1:3:4-oxdiazole of the formula

HOOC—⟨ ⟩—⟨ ⟩—C⟨ ⟩C—⟨ ⟩—⟨ ⟩—COOH
                N——N

2-[4′-carboxy-phenyl-(1′)]-5-[5″-(4‴ - carboxy-phenyl-(1‴)-1″:3″:4″-oxdiazolyl-(2″)]-1:3:4-oxdiazole of the formula

HOOC—⟨ ⟩—C⟨ ⟩C—C⟨ ⟩C—⟨ ⟩—COOH
         N——N N——N

2-[3′-carboxy-phenyl-(1′)-5-[5″-(3‴-carboxy - phenyl)-(1‴)-1″:3″:4″-oxdiazolyl-(2″)]-1′3′4-oxdiazole of the formula

HOOC—⟨ ⟩—C⟨ ⟩C—C⟨ ⟩C—⟨ ⟩—COOH
         N——N N——N

1-[5′(4‴-carboxy-phenyl)-(1‴) - 1′:3′:4′ - oxdiazolyl-(2′)]-4-[5″ - (4⁗-carboxy-phenyl) - (1⁗) - 1″:3″:4″-oxdiazolyl-(2″)]-benzene of the formula

HOOC—⟨ ⟩—C⟨ ⟩C—⟨ ⟩—C⟨ ⟩C—⟨ ⟩—COOH
         N——N       N——N

1-[5′-(3‴-carboxy-phenyl) - (1‴) - 1′:3′:4′-oxdiazolyl-(2′)] - 4 - [5″-(3⁗ - carboxy-phenyl)-(1⁗)-1″:3″:4″-oxdiazolyl-(2″)]-benzene of the formula

HOOC—⟨ ⟩—C⟨ ⟩C—⟨ ⟩—C⟨ ⟩C—⟨ ⟩—COOH
         N——N       N——N

2′-[4″-carboxy-phenyl-(1″)]-1′:3′:4′-oxdiazolyl - (5′)-β-acrylic acid of the formula

HOOC—⟨ ⟩—C⟨ ⟩C—CH=CH—COOH
         N——N and compounds of the formulae

[Structural formula with NH₂ groups]

and

[Structural formula with NH₂ and X groups]

in which X represents a hydrogen atom or a —NH₂ group or an acylamino group, especially an aroylamino group and, advantageously, compounds of the formula

[Structural formula]

in which X represents a direct bond or an arylene, especially a phenylene bridge, $n$ is the whole number 1 or 2, and A represents an anthraquinone radical, for example, an α-aminoanthraquinone radical, especially the radical

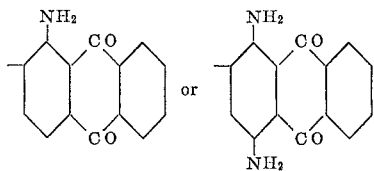

or the radical of the formula

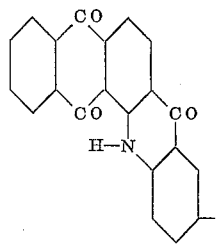

As acylating agents which contain a sulfonic acid halide group there may be mentioned more especially the sulfochlorides of thiophene carboxylic acid chlorides, of naphthoic acid chlorides, and of benzoic acid chlorides, for example, methyl-, chloro-, trifluoromethyl-, benzyl-, or phenyl-benzoyl chloride, or benzene carboxylic acid chloride itself. Sulfochlorides of sulfoalkane carboxylic acid chlorides, for example, sulfoacetic acid dichloride or sulfochloracetic acid dichloride, can also be used as acylating agents.

Reaction of the aminoanthraquinones with the acylating agents is advantageously carried out in an inert organic solvent, for example, nitrobenzene, chlorobenzene or ortho-dichlorobenzene, at an elevated temperature. It may also be carried out in a tertiary base, for example, in an anhydrous pyridine base or in pyridine. It is of advantage to use a molar ratio of the components such as to provide at least one carboxylic acid chloride group for each acylatable amino group of the anthraquinone radical.

The vat dyestuffs of the invention, which contain a sulfochloride group in an acylamino group, can also be made by the chlorination of the appropriate sulfonic acid, for example, with a phosphoric acid halide or chlorosulfonic acid, or by the oxidative chlorination, for example, with chlorine gas, of the appropriate dyestuff containing an acylamino group and having an isothiuronium group in the acyl radical. These two methods are generally of less interest than the direct acylation.

A further method of making the vat dyestuffs containing a sulfohalide group and an oxdiazole ring is to treat an appropriate dyestuff containing no sulfohalide group and/or no oxdiazole ring, but which, if it contains no oxdiazole ring, possesses a hydrazide group of the formula —CO—NH—NH—CO—, with a sulfochlorinating agent, if desired, under conditions which bring about the simultaneous formation of the oxdiazole ring. Thus, vat dyestuffs of the invention can be obtained by the direct sulfohalogenation of vat dyestuffs which contain an oxdiazole ring, or of a corresponding hydrazide compound, which is converted into an oxdiazole during the sulfohalogenation.

The dyestuffs of the invention are suitable for dyeing a very wide variety of materials, but especially for dyeing or printing textile materials of natural or regenerated cellulose by the usual vat dyeing or printing methods. The dyeings and prints produced therewith are distinguished by their excellent fastness to light and properties of wet fastness.

Dyeings produced with the dyestuffs of the invention are also fast to dry cleaning and migration. The dyed fabrics can therefore be coated with synthetic resins, for example, with polyvinyl chloride, without the dyestuff migrating into the resin, which is particularly important in the manufacture of artificial leather.

The dyestuffs of the invention can generally be vatted very easily, much more easily and rapidly than then known vat dyes devoid of sulfohalide group, often at room temperature and, if desired, with a mild reducing agent. They exhibit a very good solubility in the vat and excellent levelling and through-dyeing properties. They yield on regenerated cellulose fibrous material strong, very level dyeings which have practically the same tints as the corresponding dyeings on cotton.

The following examples illustrate the invention, the parts and percentages being by weight unless otherwise stated, and the relationship of parts by weight to parts by volume being the same as that of the kilogram to the liter.

*Example 1*

6.6 parts of benzoic acid para-sulfochloride are heated in 200 parts of nitrobenzene at 100 to 110° C. for 1 hour, while stirring, with 6 parts of thionyl chloride and 0.3 part of dimethylformamide. The excess of thionyl chloride is distilled under reduced pressure from the clear solution obtained. 5.4 parts of the compound of the formula:

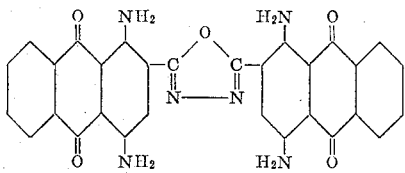

are added, and the whole is maintained at 120–125° C. for 20 hours. When the reaction mixture has cooled, the dyestuff which has crystallized out is separated off, washed with benzene and dried in vacuo.

The new dyestuff of the formula:

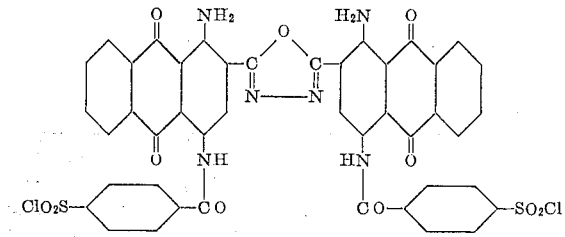

can be used as follows:

2.0 parts of the dyestuff are vatted at 45° C. in 500 parts of water with 15 parts of sodium hydrosulfite and 24 parts by volume of sodium hydroxide solution of 30% strength. The stock vat thus obtained is added to a solution of 4 parts by volume of sodium hydroxide solution of 30% strength and 2 parts of sodium hydrosulfite in 3500 parts of water. In the dyebath thus obtained, 100 parts of cotton are dyed for 1 hour at 40 to 50° C., 80 parts of sodium chloride being added. The cotton is then squeezed, oxidized in the air, rinsed, acidified, again rinsed and then soaped at the boil. The cotton is dyed reddish blue and the dyeing possesses a very good fastness to light and very good properties of wet fastness.

By using in this example, instead of benzoic acid para-sulfochloride, the same amount of benzoic acid meta-sulfochloride a very similar dyestuff is obtained which also possesses excellent fastness properties.

*Example 2*

6.8 parts of thiophene-2-carboxylic acid-5-sulfochloride are heated in 200 parts of nitrobenzene at 115 to 120° C., while stirring, for one hour with 6 parts of thionyl chloride and 0.3 part of dimethylformamide. The excess of thionyl chloride is distilled under reduced pressure from the clear solution so obtained. 5.4 parts of the compound of the formula:

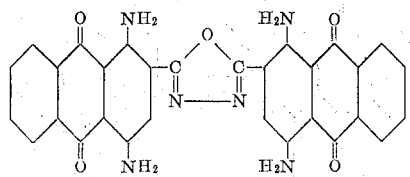

are added to the reaction mixture, and the whole is maintained for 3 hours at 120 to 125° C. and then for a further 3 hours at 140 to 145° C. After cooling the mixture to 100° C., the dyestuff which has crystallized out is filtered off, washed with benzene, and dried in vacuo.

The new dyestuff of the formula:

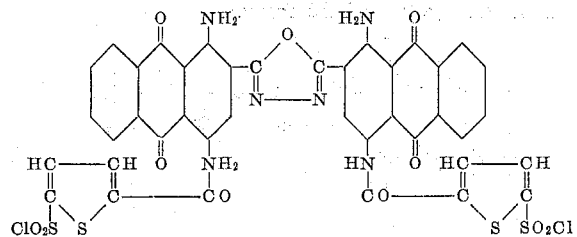

yields on cellulosic fibers, when applied by the method described in Example 1, blue dyeings having excellent properties of fastness.

*Example 3*

8.9 parts of diphenyl-4-carboxylic acid sulfochloride, obtained by the sulfochlorination of para-phenylbenzoic acid with chlorosulfonic acid at 90 to 100° C., are heated in 200 parts of nitrobenzene at 115 to 120° C., while stirring, with 6 parts of thionyl chloride and 0.3 part of dimethylformamide. The excess of thionyl chloride is distilled under reduced pressure from the clear solution obtained. 5.4 parts of the compound of the formula

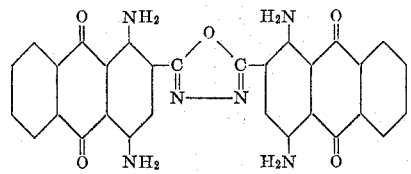

are added to the reaction mixture, and the whole is maintained for 3 hours at 120 to 125° C., for 19 hours at 150 to 155° C. and for 4 hours at 180 to 185° C. After cooling the mixture to 100° C., the dyestuff which has crystallized out is filtered off, washed with benzene, and dried in vacuo.

The new dyestuff of the formula

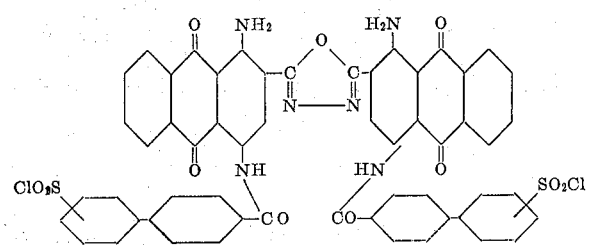

yields on cellulosic fibers, when applied by the method described in Example 1, blue dyeings having excellent properties of fastness.

*Example 4*

6.6 parts of benzoic acid-meta-sulfochloride are heated in 200 parts nitrobenzene at 100 to 110° C. while stirring, with 6 parts of thionylchloride and 0.3 part of dimethylformamide, for one hour. The excess of thionyl chloride is distilled under reduced pressure from the clear solution obtained. 5.4 parts of the compound of the formula

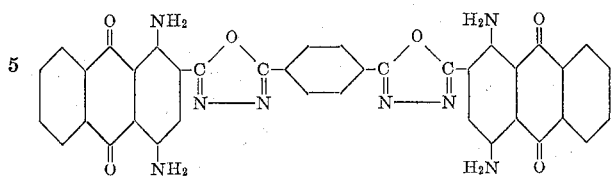

are then added, and the whole is heated at 120 to 125° C. for one hour and then at 150 to 155° C. for 3 hours. When the reaction mixture is cold, the dyestuff which has crystallized out is separated off, washed with benzene, and dried in vacuo. The new dyestuff of the formula

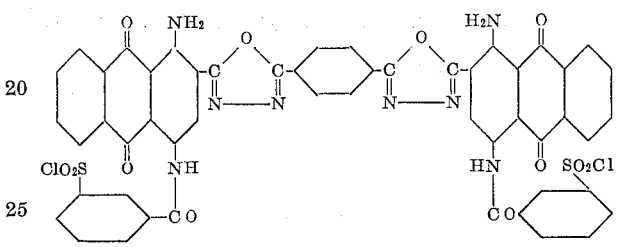

yields on cellulosic fibers, when applied by the method described in Example 1, blue dyeings having excellent properties of fastness.

*Example 5*

5.4 parts of 2,5-di-(1',4'-diamino-2'-anthraquinonyl)-1,3,4-oxdiazole in 130 parts of anhydrous nitrobenzene and 2.5 parts of benzoyl chloride are stirred while being heated at 80–85° C. for 3 hours, and at 90–100° C. for another 3 hours. 1.6 parts of acetyl chloride are then added and the batch heated at 140–145° C. for another 15 hours. The dyestuff which precipitates in the form of fine needles is isolated by filtration, washed in turn with nitrobenzene, benzene, and acetone, then dried in vacuo at 80–90° C.

The new vat dyestuff so obtained corresponds to the formula.

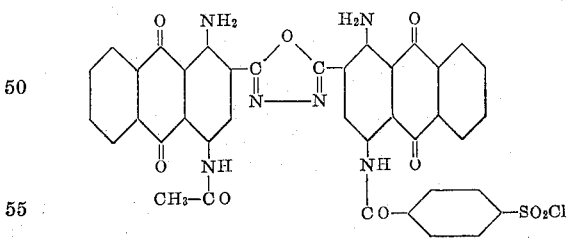

When used according to the method described in Example 1, it dyes cotton and regenerated cellulose strong blue tints having excellent fastness properties.

*Example 6*

5.4 parts of finely ground 2,5-di-(1',4'-diamino-2'-anthraquinonyl)-1,3,4-oxdiazole in 160 parts of anhydrous nitrobenzene, and 2.4 parts of benzoylchloride-para-sulfochloride are stirred for 1 hour while being heated at 70–75° C., for 4 hours at 80–85° C., and for 19 hours at 90–95° C. 2.8 g. of benzoylchloride are then added and the batch heated for 4 hours at 130–135° C. and for 5 hours at 140–145° C. The dyestuff which precipitates in the form of fine needles is isolated by filtration and washed in turn with nitrobenzene, benzene, and acetone, then dried in vacuo at 80–90° C.

The new vat dyestuff so obtained corresponds to the formula

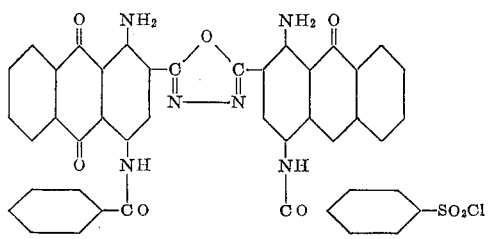

When used according to the dyeing prescription given in Example 1, it yields on cotton and regenerated cellulose strong blue tints having excellent fastness properties.

In an analgous manner, the dyestuff of the formulae

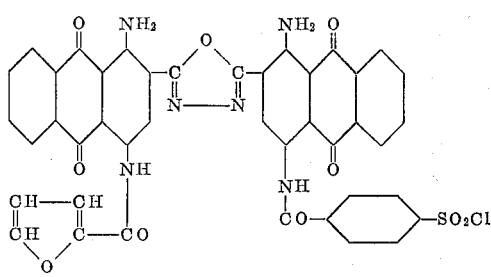

and

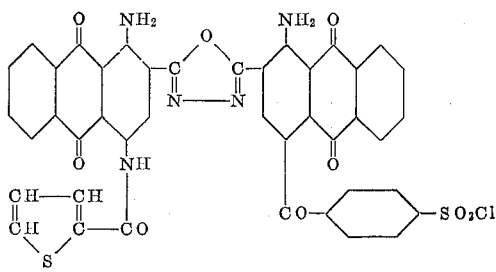

can be prepared.

The dyes of the invention are particularly suitable for dyeing cotton according to the following procedure.

1.5 parts of dyestuff are suspended in 500 parts of water at 60° C. The dyestuff suspension is poured into a dyebath containing 20 parts of 30% sodium hydroxide solution and 12 parts of sodium hydrosulfite in 3500 parts of water. 100 parts of well wetted cotton are entered into the bath at 50° C. and dyed for 45 minutes at 50° C., 40 parts of sodium chloride being added after the first 10 minutes and another 40 parts 10 minutes later. The cotton is removed from the bath, oxidized, neutralized, thoroughly soaped, rinsed in cold water and then in warm water, and dried.

*Example 7*

2.71 parts of 2,5-di-(1',4'-diamino-2'-anthroquinonyl)-1,3,4-oxdiazole in 70 parts by volume of anhydrous nitrobenzene are ground for 4 hours in a ball mill. The resulting paste is put into the reaction vessel with 100 parts by volume of anhydrous nitrobenzene, and the suspension heated to 70° C. 4.58 parts of furan-2-carboxylic acid chloride-5-sulfochloride, dissolved in 35 parts by volume of anhydrous nitrobenzene are run in, a few drops of dimethylformamide are added, and the temperature then raised to 120–125° C. The bath is stirred for 2 hours, the temperature then raised to 140° C. and the batch stirred at that temperature for 3½ hours. It is then filtered with suction while hot, the residue washed in turn with nitrobenzene, benzene, and alcohol, and the product dried in vacuo at 40–50° C.

The dyestuff of the formula

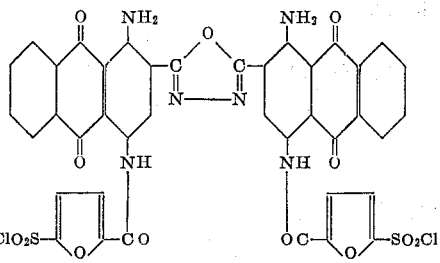

prepared in this manner dyes cotton and regenerated cellulose by the known vat dyeing methods blue tints having good fastness properties.

What is claimed is:

1. A vat dyestuff of the formula

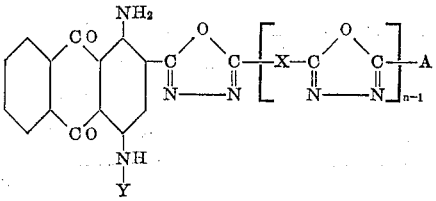

in which X represents a member selected from the group consisting of a direct bond, phenylene and biphenylene, $n$ is a whole number up to 2, A represents an anthraquinone radical selected from the group consisting of

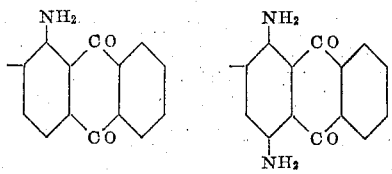

and

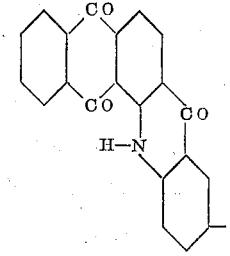

and Y represents an at most bicyclic member selected from the group consisting of thenoyl-, furnane-2-CO-, naphthoyl- and benzoyl- containing a sulfohalide group.

2. A vat dyestuff as claimed in claim 1, wherein $n$ is 1.
3. A vat dyestuff as claimed in claim 1, where Y is Cl—SO₂—benzoyl-.
4. A vat dyestuff as claimed in claim 1, wherein Y is

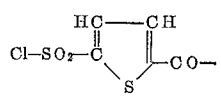

5. A vat dyestuff as claimed in claim 1, in which A represents an α-aminoanthraquinone radical.
6. A vat dyestuff as claimed in claim 1, in which A represents the radical of the formula

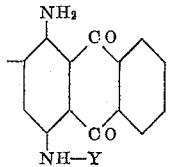

7. A vat dyestuff as claimed in claim 1, wherein A corresponds to the formula

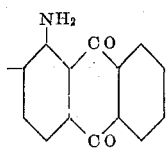

8. A vat dyestuff as claimed in claim 6, wherein the Y's are different from one another.

9. The vat dyestuff of the formula

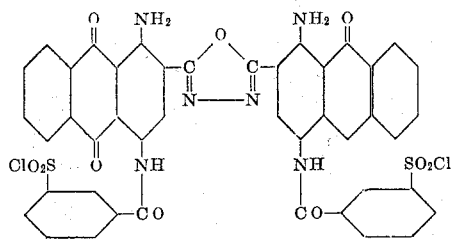

10. The vat dyestuff of the formula

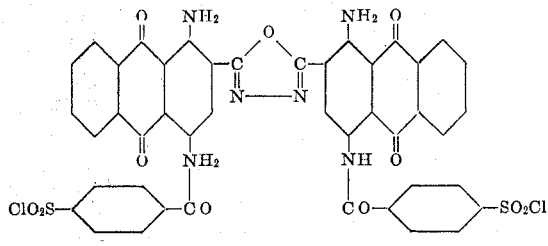

11. The vat dyestuff of the formula

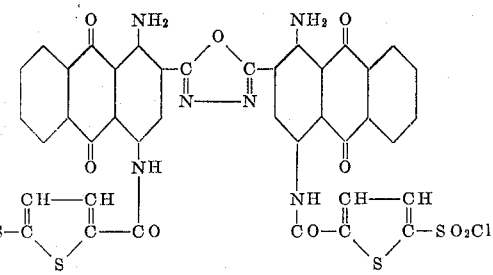

12. The vat dyestuff of the formula

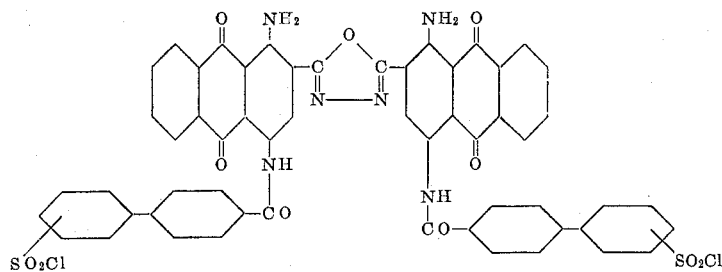

13. The vat dyestuff of the formula

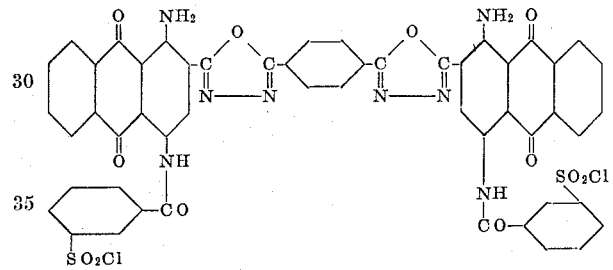

References Cited by the Examiner

UNITED STATES PATENTS

| | | | |
|---|---|---|---|
| 2,174,072 | 9/1939 | Kranzlein et al. | 260—307.5 |
| 2,629,718 | 2/1953 | Belshaw et al. | 260—307.5 |
| 2,759,948 | 8/1956 | Schwechten | 260—307.5 |
| 2,985,656 | 5/1961 | Weber | 260—303 |

OTHER REFERENCES

Karrer, P., Organic Chemistry, New York, Elsevier, 1947, p. 109.

ALEX MAZEL, *Primary Examiner.*

HENRY R. JILES, NICHOLAS S. RIZZO, *Examiners.*

R. J. GALLAGHER, *Assistant Examiner.*

UNITED STATES PATENT OFFICE
CERTIFICATE OF CORRECTION

Patent No. 3,300,509　　　　　　　　　　　　　January 24, 1967

Kurt Weber

It is hereby certified that error appears in the above numbered patent requiring correction and that the said Letters Patent should read as corrected below.

Column 9, lines 44 to 54, the lower left-hand portion of the formula should appear as shown below instead of as in the patent:

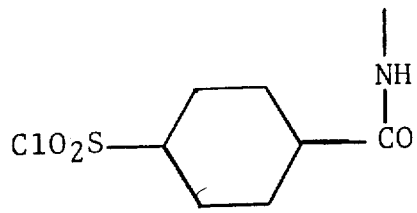

Signed and sealed this 28th day of November 1967.

(SEAL)
Attest:

EDWARD M. FLETCHER, JR.　　　　　　　　EDWARD J. BRENNER
Attesting Officer　　　　　　　　　　　Commissioner of Patents